(12) United States Patent
Shetty et al.

(10) Patent No.: US 9,294,347 B2
(45) Date of Patent: Mar. 22, 2016

(54) SYSTEMS AND METHODS FOR AUTOMATIC ACCESS LAYER CONFIGURATION

(71) Applicants: Sudhir V. Shetty, Cedar Park, TX (US); Raja S. Jayakumar, Fremont, CA (US)

(72) Inventors: Sudhir V. Shetty, Cedar Park, TX (US); Raja S. Jayakumar, Fremont, CA (US)

(73) Assignee: Dell Products LP, Round Rock, TX (US)

( * ) Notice: Subject to any disclaimer, the term of this patent is extended or adjusted under 35 U.S.C. 154(b) by 184 days.

(21) Appl. No.: 14/220,763

(22) Filed: Mar. 20, 2014

(65) Prior Publication Data

US 2015/0271010 A1  Sep. 24, 2015

(51) Int. Cl.
*G06F 15/16* (2006.01)
*H04L 12/24* (2006.01)

(52) U.S. Cl.
CPC .................................. *H04L 41/0803* (2013.01)

(58) Field of Classification Search
CPC .................................................. H04L 41/0803
See application file for complete search history.

(56) References Cited

U.S. PATENT DOCUMENTS

| 8,510,422 | B2 | 8/2013 | Phung et al. | |
|---|---|---|---|---|
| 8,649,259 | B2 * | 2/2014 | Allan | H04L 45/66 370/218 |
| 8,649,379 | B2 * | 2/2014 | Subramanian | H04L 45/245 370/389 |
| 8,726,093 | B2 * | 5/2014 | Droux | G06F 11/2005 714/25 |
| 8,793,687 | B2 * | 7/2014 | Kidambi | H04L 49/70 718/1 |
| 8,831,000 | B2 * | 9/2014 | Mishra | 370/252 |
| 8,908,691 | B2 * | 12/2014 | Biswas | H04L 12/4633 370/392 |
| 9,071,548 | B2 * | 6/2015 | Lucau | H04L 49/70 |
| 9,100,289 | B2 * | 8/2015 | Mehta | H04L 43/0817 |
| 2006/0190532 | A1 | 8/2006 | Chadalavada | |
| 2006/0212143 | A1 | 9/2006 | Nguyen et al. | |
| 2012/0110262 | A1 | 5/2012 | Zhang et al. | |
| 2012/0324460 | A1 * | 12/2012 | Kamath | G06F 9/4881 718/102 |
| 2013/0205063 | A1 | 8/2013 | Zhang et al. | |
| 2013/0322446 | A1 * | 12/2013 | Biswas | H04L 12/4633 370/392 |
| 2014/0082236 | A1 | 3/2014 | Zhang et al. | |
| 2015/0074661 | A1 * | 3/2015 | Kothari | H04L 49/70 718/1 |
| 2015/0263937 | A1 * | 9/2015 | MacChiano | H04L 45/22 709/223 |
| 2015/0263991 | A1 * | 9/2015 | MacChiano | H04L 47/41 370/400 |

OTHER PUBLICATIONS

Dell, Dell Active System 50, Small, Self Contained System for Basic Application Needs, © 2013, 2 pgs.
Dell, Dell Active System 200, Intermediate, Scalable System for General Application Needs, © 2013, 2 pgs.
Dell, Dell Active System Manager 7.5, Automated IT Service Delivery & Infrastructure Management, © 2013, 2 pgs.

(Continued)

*Primary Examiner* — Moustafa M Meky
(74) *Attorney, Agent, or Firm* — Egan, Peterman, Enders & Huston, LLP.

(57) ABSTRACT

Systems and methods are provided that may be employed for automatic access layer configuration, for example, to achieve correct server profile provisioning so as to enable information handling system network connectivity from a server through one or more aggregator switches that is configured to fit a given workload and/or network connectivity architecture. The disclosed systems and methods may be implemented using intelligent platform enablement and exchange of information between information handling system compute resource/s and adjacent access layer switch/es.

20 Claims, 6 Drawing Sheets

(56) References Cited

OTHER PUBLICATIONS

Dell, Dell Active System 800, Enterprise, Highly Scalable System for Business Critical Application Needs, © 2013, 2 pgs.
Ganesan et al., "System and Method for Managing Vlan Associations With Network Ports", U.S. Appl. No. 14/047,329, filed Oct. 7, 2013, 29 pgs.
Rahardjo et al., "Systems and Methods for Power Supply Configuration and Control", U.S. Appl. No. 13/746,113, filed Jan. 21, 2013; Dell:154, 34 pgs.
Shetty et al., "Systems and Methods for Infrastructure Template Provisioning in Modular Chassis Systems", U.S. Appl. No. 13/955,423, filed Jul. 31, 2013, Dell:166, 34 pgs.
Dell, Dell PowerEdge M I/O Aggregator Configuration Quick Reference, Rev. 1.0, Oct. 2012, 13 pgs.
Dell, Broadcom, NIC Partitioning (NPAR) FAQs, 57712-k, Apr. 20, 2011, 9 pgs.
Broadcom White Paper, "Enhancing Scalability Through Network Interface Card Partitioning", Apr. 2011, 6 pgs.

\* cited by examiner

SYSTEMS AND METHODS FOR AUTOMATIC ACCESS LAYER CONFIGURATION

FIELD OF THE INVENTION

This invention relates generally to information handling systems and, more particularly, to access layer configuration for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include servers that are connected to multiple client devices across a network by access layer switches. Each of the client devices may itself be an information handling system configured as a host computer. The network may be partitioned by the access layer switches and distribution layer switches to form different virtual local area networks (VLANs) that each include different groupings of client devices within an end user network environment.

A conventional workflow for deploying a workload or server profile on a physical server requires appropriate provisioning of the access layer network switches to enable network connectivity from a given server to the particular network environment. This conventionally requires a complex external orchestration tool (such as Dell "Active Systems Manager" tool available from Dell Products L.P. of Round Rock, Tex.) running on a controller that is external and separate from the server chassis that is aware of all connectivities between compute and switching components. Such an external orchestration also requires a correct configuration sequence that is controlled externally to the server chassis to correctly configure the compute and access layer switches for up-link connectivity to the distribution layer of the end user network, and requires external determination of port connectivity between the server and each access layer switch by typically using hard-coded mapping tables that are not maintainable. In other words, intrinsic knowledge of how the compute is connected to the access layer is conventionally required (e.g., the wiring between the blades and access layer switch modules is based on hard-coded knowledge of how the conventional server is configured for different permutations of slot location, slot type, NIC type, fabric and fabric switch) that is not maintainable. Appropriate VLAN provisioning on the server-facing switch port is also typically required, as well as appropriate down-link connectivity from the access layer switch over each server-facing switch port.

SUMMARY OF THE INVENTION

Disclosed herein are systems and methods that may be employed for automatic access layer configuration, e.g., to achieve correct server profile provisioning so as to enable information handling system network connectivity from server through access layer switches that is configured to fit a given workload and/or network connectivity architecture. Using the disclosed systems and methods, orchestration between compute (e.g., server-side) switches and access layer switches may be automatically achieved in one exemplary embodiment using intelligent platform enablement and exchange of information between information handling system compute resource/s (e.g., such as multiple individual server blades) and adjacent access layer switch/es. In this regard, the converged network adapter (CNA) of an appropriate server blade may be correctly configured by an out-of-band processing device based on virtual local area network (VLAN) availability, e.g., providing accurate knowledge of VLAN accessibility and physical connectivity between a server port of the server blade and the adjacent access layer switch/es.

In one embodiment, the disclosed systems and methods may be implemented to enable a wider spectrum of consoles and system integrations by automatically performing access layer configuration using internal information handling system compute resource/s, rather than relying on conventional complex external orchestration software. Advantageously, the disclosed systems and method may be so implemented to simplify access layer configuration using internal information handling system (e.g., server) compute resource/s in a manner that reduces the involvement and input required from an external console. In one exemplary embodiment, such automation of network connectivity for a server administrator may be implemented to open up access layer configuration capability to system users that are server-centric in their provisioning approach, and also may be implemented to enable a variety of different consoles/integrations that automatically configure access layer resources via an out-of-band processing device, e.g., allowing extension of the server administrator's boundary from the server to the access fabric.

In one respect, disclosed herein is an information handling system configured for coupling to an external network, including: an access layer including at least one aggregator switch including an aggregator switch processing device and multiple logical switches controlled by the processing device, the aggregator processing device being configured to control the multiple logical switches to selectably route network communications between the information handling system and the external network across one or more corresponding selected separate external network communication streams; at least one in-band processing device; at least one converged network adapter (CNA) coupled between the in-band processing device and the logical switches of the aggregator switch; and at least one out-of-band processing device coupled to control the CNA, the out-of-band processing device being separate from the in-band processing device. The aggregator switch processing device may be configured to automatically: discover an identity of the selected external network communication streams corresponding to the network communications; and communicate the discovered identity of the selected network communication streams from the aggregator switch to the out-of band processing device through the CNA.

In another respect, disclosed herein is a method for automatically configuring an access layer of an information handling system having an in-band processing device that is coupled to an external network through at least one converged network adapter (CNA) and an aggregator switch of the access layer. The method may include: controlling multiple logical switches of the aggregator switch with an aggregator switch processing device to selectably route in-band processing device communications between the CNA of the information handling system and the external network across one or more corresponding selected separate external network communication streams that extend between the aggregator switch and the external network; and using at least one out-of-band processing device of the information handling system that is separate from the in-band processing device to control the CNA. The method may also include using the aggregator switch processing device to automatically: discover an identity of the selected external network communication streams corresponding to the network communications, and communicate the discovered identity of the selected network communication streams to the out-of band processing device from the aggregator switch through the CNA.

DESCRIPTION OF ILLUSTRATIVE EMBODIMENTS

Figure 1:
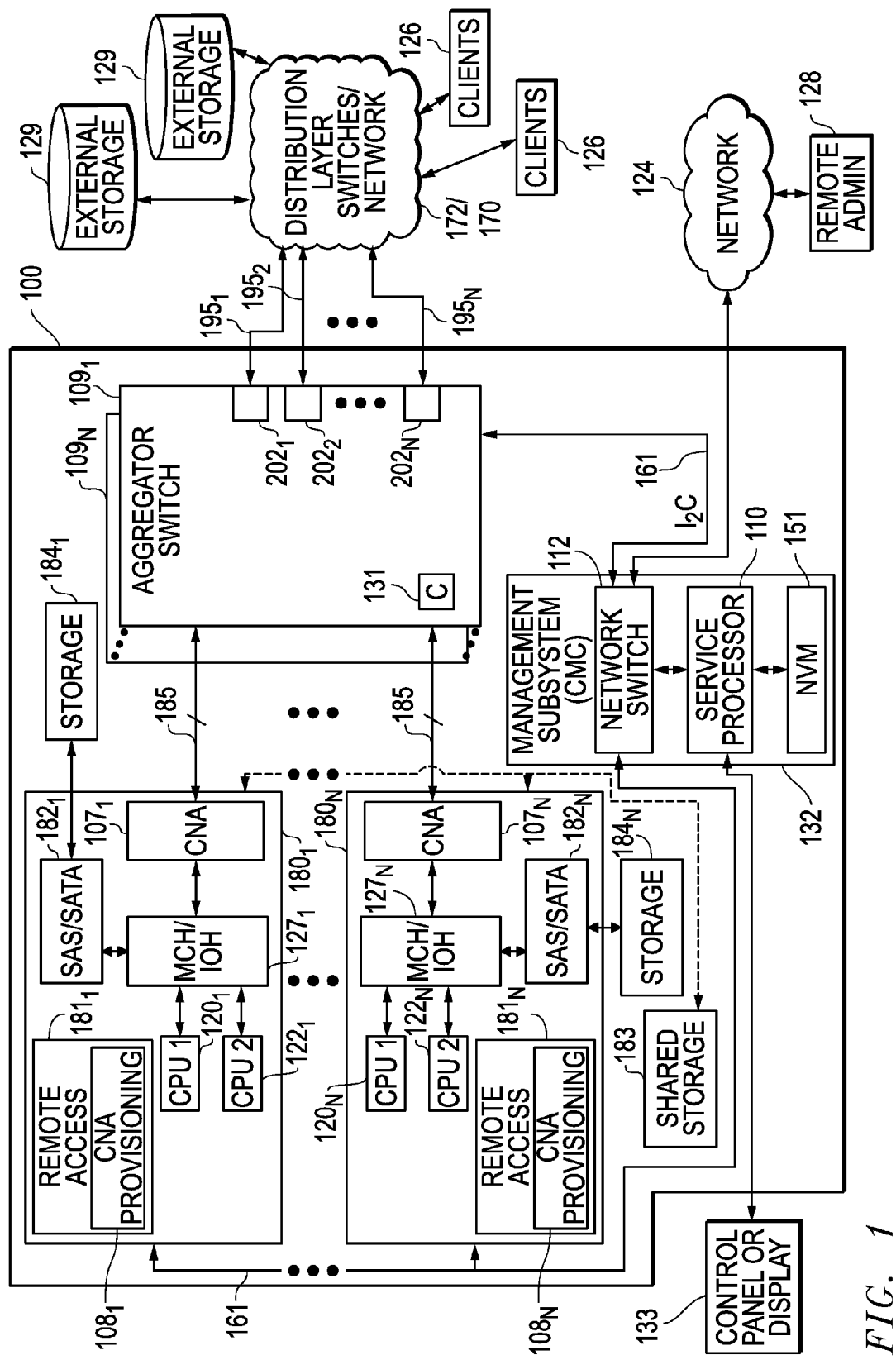
FIG. 1 is a simplified block diagram of an information handling system according to one exemplary embodiment of the disclosed systems and methods.
Figure 2:
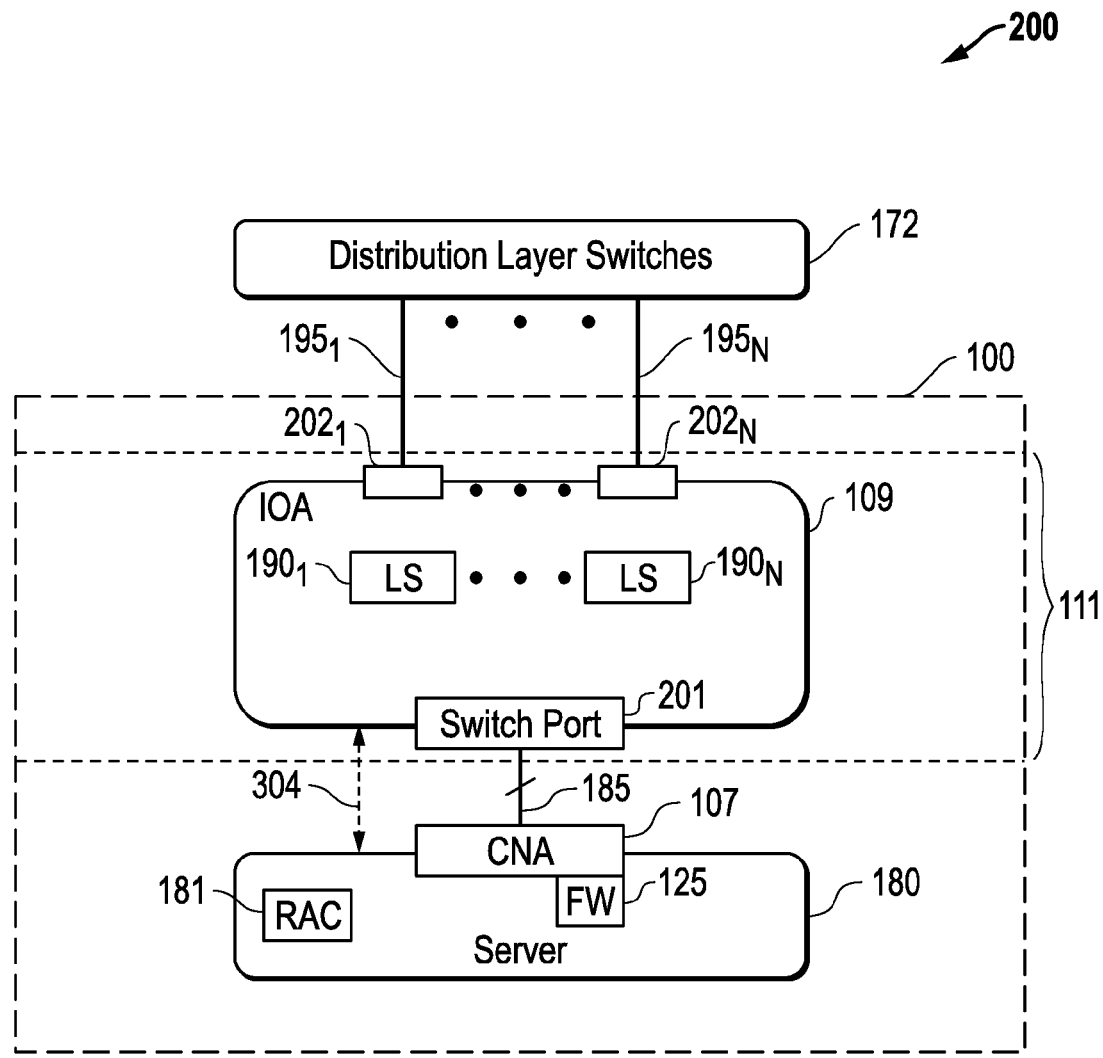
FIG. 2 illustrates a simplified block diagram of a network architecture according to one exemplary embodiment of the disclosed systems and methods.

FIG. 1 is a block diagram illustrating one exemplary embodiment of a scalable information handling system configured in the form of a modular blade server chassis system that includes a chassis 100 having an outer structural physical framework within which various indicated compute, networking and storage resources of FIG. 1 are contained, with provision for connection to various external networks and devices as shown. In this embodiment, individual modular compute, networking and/or storage resources may be added and/or removed from the system 100 (e.g., as removable and/or hot-pluggable modular components) and/or reconfigured over time so as to change the capabilities and/or performance of the system. Connectivity between modular compute, networking and/or storage resources may also be reconfigured within the chassis 100.

It will be understood that although FIG. 1 illustrates a particular exemplary embodiment of a modular blade server chassis system 100, the disclosed systems and methods may be alternatively implemented with any other configuration of scalable information handling system that utilizes compute, networking and/or storage resources that are removable, hot-pluggable, or otherwise changeable over time, possibly together with the configured connectivity between these resources. Besides modular blade server systems, other examples of such scaleable information handling systems include, but are not limited to, a rack server system that includes multiple modular rack servers that are each coupled to, or otherwise has connectivity to, a network (e.g., internet, intranet, etc.), for example, via a top-of-rack (ToR) switch.

Referring to FIG. 1 in more detail, system 100 includes a plurality of information handling system compute nodes configured in the form of multiple removable or hot-pluggable modular blade servers $180_1$ to $180_N$ that may be removably coupled to system network communications and power, e.g., via a backplane or midplane. As shown, in this exemplary embodiment each of blade servers $180_1$ to $180_N$ includes two in-band processing devices in the form of central processing units (CPUs) 120 and 122 that execute an in-band (e.g., host) operating system (OS) although it is possible that each blade server 180 may have only one CPU or other in-band processing device or may be provided with more than two CPUs or other in-band processing devices. Each of CPUs 120 and 122 of a given blade 180 are coupled to memory controller hub/IO hub circuitry 127 of the blade 180, which is in turn coupled to a respective converged network adapter (CNA) 107 that handles network communications between network fabric link/s 185 and the CPUs and other components of each blade 180 as shown. Each CNA 107 may be implemented, for example, using LAN-on-motherboard modules (LOMs) supporting Gigabit Ethernet and/or removable or pluggable (customizable) mezzanine cards supporting other fabric protocols such as Gigabit Ethernet, PCIe, SATA, SAS, Fibre Channel, Fiber Channel over Ethernet (FCoE), Internet Small Computer System Interface (iSCSI), etc.

As shown in FIG. 1, each of blade servers $180_1$ to $180_N$ may be optionally provided with local storage 184, e.g., in the form of one or more removable or hot-pluggable hard disk drives (HDD) that may be coupled via a local storage controller 182 to implement local storage for blade servers 180. Local controllers 182 may be configured to communicate with local storage 184 using any suitable interface standard (e.g., Serial Attached SCSI (SAS), Serial Advanced Technology Attachment (SATA)), and in one exemplary embodiment may be configured to implement RAID functionality. Further, optional shared storage 183 (e.g., one or more removable and/or pluggable disk drives) may also be provided that is accessible by each of blade servers $180_1$ to $180_N$ e.g., via a backplane or midplane.

It will be understood that the particular illustrated components of each blade server 180 are exemplary only, and that additional, fewer, and/or alternative components may be present. For example, individual blade servers 180 may also include additional or alternative components such as baseboard management controllers (BMCs) that may execute out-of-band programming, random access memory (RAM) and/or non-volatile random access memory (NVRAM) that may be present for purposes of saving and/or retrieving information used by the corresponding CPUs 124 and/or BMC of the same blade server 180, etc.

Still referring to FIG. 1, each of network fabric links 185 may be any type and number of bandwidth network communication links that are suitable for communicatively coupling CNA's 107 of server blades 180 with external distribution layer switches 172 and network 170 through an access layer that includes one or more aggregator switches (or 10 modules) $109_1$-$109_N$ as shown, each of which provides physical (PHY) layer connection path/s for external network communications. Examples of suitable types of communication protocols across network fabric links 185 include, but are not limited to, Gigabit Ethernet, PCIe, SATA, SAS, Fibre Channel, etc. such as described above. Additionally, each of network fabric links 185 may be single lane or multi-lane in configuration. In the illustrated embodiment, each aggregator switch 109 may be present as shown to handle communications with external devices (e.g., such as external clients 126 and external storage devices 129) via external network/s 170, e.g., Internet, corporate intranet, local area network (LAN), storage area network (SAN), interprocessor communications (IPC), etc.

In this regard, each aggregator switch 109 may include one or more logical switches 190 that provide communication between downstream aggregator switch port 201, and uplink switch ports 202 as shown in FIGS. 2-5. Multiple logical switches 190 of each aggregator switch 109 may also be controlled and configured by a controller 131 to selectably route data traffic between aggregator switch port 201 and uplink switch ports 202, and to logically combine multiple streams of data from multiple respective server blades 180 onto a fewer number of external network communication streams (e.g., link aggregation groups "LAGs") 195. Moreover LAGs 195 may also be optionally and variously configured to support multiple individual communication streams or to act in failover mode. Examples of types of external network communications 195 that may be supported by an aggregator switch 109 include, but are not limited to Ethernet, Fibre Channel, Infiniband, etc. In one embodiment, an aggregator switch 109 may be a Dell PowerEdge M I/O Aggregator, available from Dell Products L.P. of Round Rock, Tex., although any other switching device/s suitable for performing the tasks described herein for an aggregator switch 109 may be employed.

It will be understood that an access layer may in one embodiment be present as multiple physical aggregator switches 109, e.g., on a modular chassis 100 there may in one example be 6 access layer switches. In such an embodiment, a given modular server 180 (e.g., blade) may have physical connectivity to all 6 switches, e.g., through 3 physical NICS/CNAs 107 with 2 ports each such that port1 connects to switch 1, etc. It will be further understood that in such an embodiment, the logical switches 190 may be provided within of the 6 physical switches.

As further shown in FIG. 1, server chassis system 100 may include a local management subsystem or Chassis Management Controller (CMC) 132 contained within the chassis that includes an out-of-band local processing device in the form of an embedded service management processor 110 (e.g., such as a baseboard management controller (BMC) microcontroller or any other suitable type of processing device) together with an optional network switch 112 that interfaces with external entities across network 124, e.g., Internet, corporate intranet, etc. Embedded service management processor 110 may be employed to perform the processing tasks for management subsystem (CMC) 132 in an out-of-band manner that is performed separately from in-band (e.g., Host) CPUs 120 and 122 of servers 180 and the associated operating system/s of each server 180. Further, management subsystem (CMC) 132 may also include integral non-volatile memory 151 (e.g., such as NVRAM) coupled to embedded service management processor 110 (or alternatively may be coupled to external non-volatile memory) to facilitate the accomplishment of tasks of management subsystem (CMC) 132 as described further herein.

As shown, management subsystem (CMC) 132 may be coupled via network 124 to remote administrator/s 128 and/or directly to an optional local control panel and/or display and user interface 133 for displaying information and for local administrator interface to server system 100. In one embodiment, management subsystem 132 may provide local and/or remote control, reproduction and display of server operating parameters, for example, by out of band methods such as Web graphical user interface (GUI) using an integrated Dell Remote Access Controller (iDRAC) available from Dell Products L.P. of Round Rock, Tex. and/or textually via Intelligent Platform Management Interface (IPMI), Dell Remote Access Controller (RACADM) or WS Management (WS-MAN). Further information on remote access controllers may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

As further shown in FIG. 1, each of blade servers 180$_1$ to 180$_n$ may include a respective out-of-band processing device in the form of a remote access controller 181 (e.g., such as integrated Dell Remote Access Controller (iDRAC) available from Dell Products L.P. of Round Rock, Tex.) configured for communication with management subsystem 132 (e.g., such as integrated Dell Remote Access Controller (iDRAC) available from Dell Products L.P. of Round Rock, Tex.). In such an embodiment, each remote access controller 181$_1$ to 181$_N$ may exchange management information (e.g., such as component status, component inventory, component configuration, alerting, power status and control commands, component operation monitoring, etc.) information with management subsystem (CMC) 132 of system 100 across any suitable type of management communication path 161 (e.g., I$^2$C bus). In the illustrated embodiment, each remote access controller 181 is provided with a respective converged network adapter (CNA) provisioning module 108 that is configured to perform CNA provisioning tasks in a manner as described further herein. However, it will be understood that the tasks (including CNA provisioning tasks) of one or more remote access controller/s 181 may be alternatively performed, for example, by service processor 110 or other processing device within management subsystem 132.

Also as shown, management subsystem 132 may also be similarly coupled to exchange management information with each aggregator switch 109 and other components (e.g., such as power supply units, cooling fans, etc.) across management communication path 161 and/or other suitable management communication path/s. In this way, the management communication architecture of FIG. 1 may be employed to allow management subsystem 132 to monitor system and component status and operation, as well as to configure and control operation of individual components and groups of components to implement and/or change particular system architectures and/or operations, e.g., in a manner so as to implement CNA provisioning tasks as described elsewhere herein. Further information on exemplary management subsystem operations and configuration which may be implemented with modular chassis systems in the practice of the disclosed systems and methods may be found in U.S. patent application Ser. No. 13/746,113 filed on Jan. 21, 2013, and in U.S. patent application Ser. No. 13/955,423 filed on Jul. 13, 2013, each of which is incorporated herein by reference in its entirety.

FIGS. 2-5 illustrate a simplified block diagram of a network architecture 200 showing an individual server (e.g., one of modular servers 180$_1$-180$_N$ of FIG. 1) with its respective CNA 107 coupled by one or more fabric links 185 to an aggregator switch 109 (e.g., one of aggregator switches $109_1$-$109_N$ of FIG. 1) of access layer 111. In particular, CNA 107 is coupled by one or more fabric links 185 to a corresponding aggregator switch port 201 of aggregator switch 109, which is provided with multiple access layer logical switches 190. Aggregator switch 109 may in turn be coupled by one or more up-link switch ports 202 across external network communication links 195 to distribution layer switches 172 as shown, with logical switches 190 configured to selectively route data traffic between CNA 107 and other server CNA ports 107, as well as between CNA 107 and uplink ports 202 according to VLAN domains configured on the logical switch/es 190. In this regard, it will be understood that in one embodiment there may be some logical switches 190 that are provided that do not connect to any uplink switch ports 202, but are solely created to allow connectivity between different CNA ports 107 on various servers 180 of the server chassis system 100. Examples of distribution layer switches 172 include, but are not limited to, Top of Rack (ToR) switches, End of Row (EOR) switches, Aggregation switches and Core switches. It will be understood that although FIGS. 2-5 illustrates a single server 180 and single aggregator switch 109, multiple servers 180 (e.g., such as servers $180_1$-$180_N$ of the embodiment of FIG. 1) may be similarly coupled to a common aggregator switch 109 or multiple aggregator switches of an access layer 111, which may simultaneously handle communications between each of multiple servers 180 and one or more distribution layer switches 172.

Figure 4:
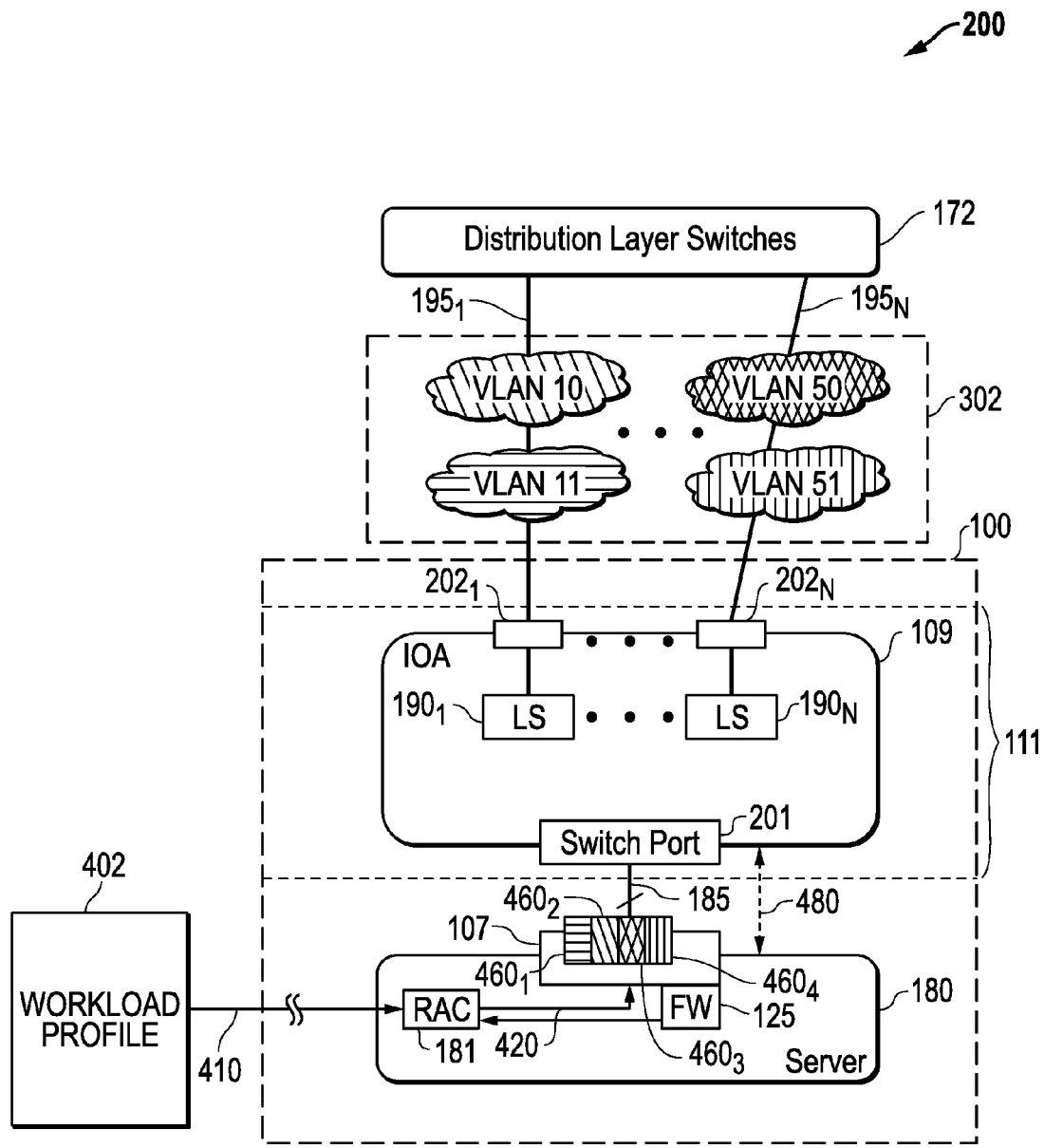
FIG. 4 illustrates a simplified block diagram of a network architecture according to one exemplary embodiment of the disclosed systems and methods.
Figure 5:
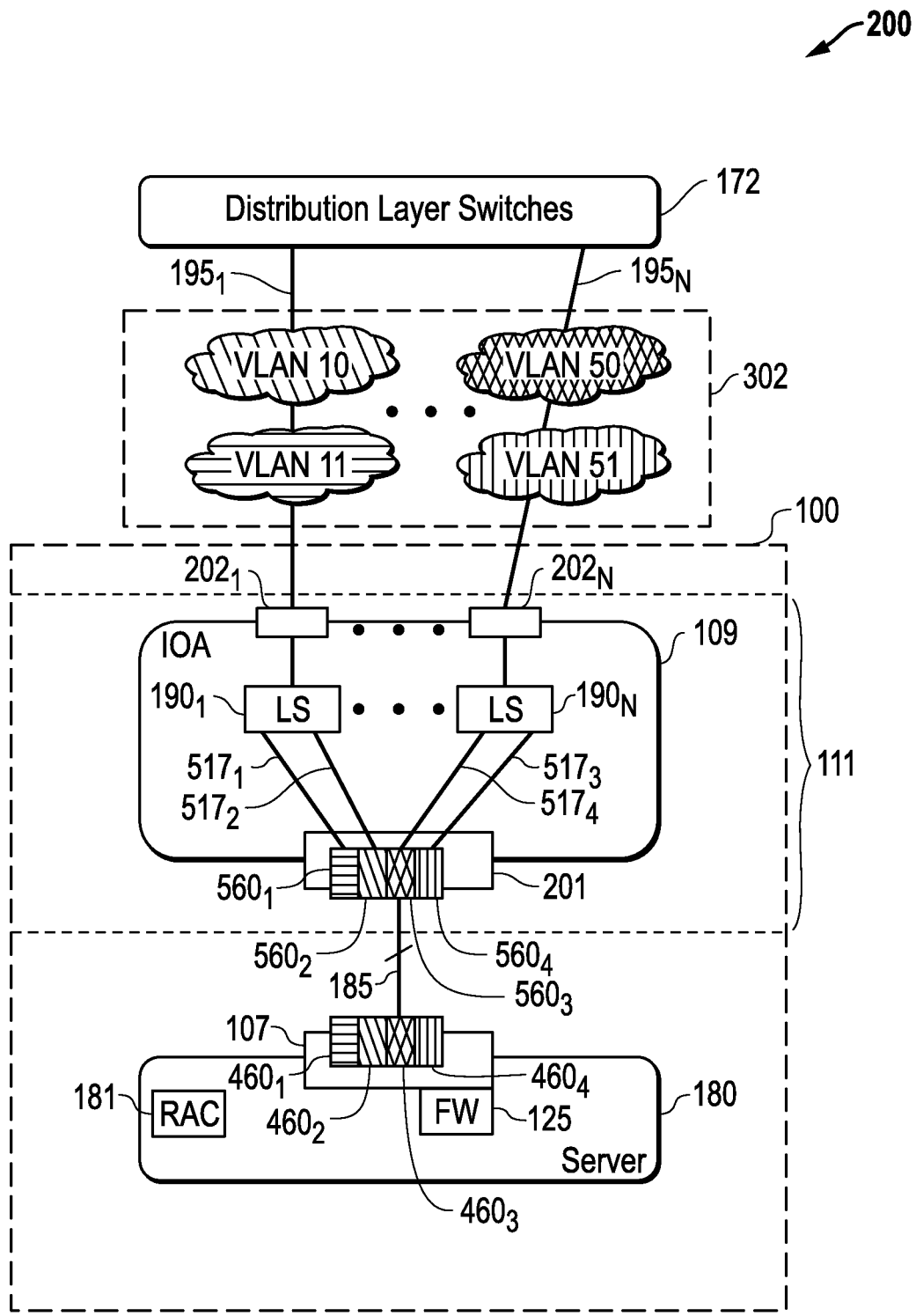
FIG. 5 illustrates a simplified block diagram of a network architecture according to one exemplary embodiment of the disclosed systems and methods.
Figure 6:
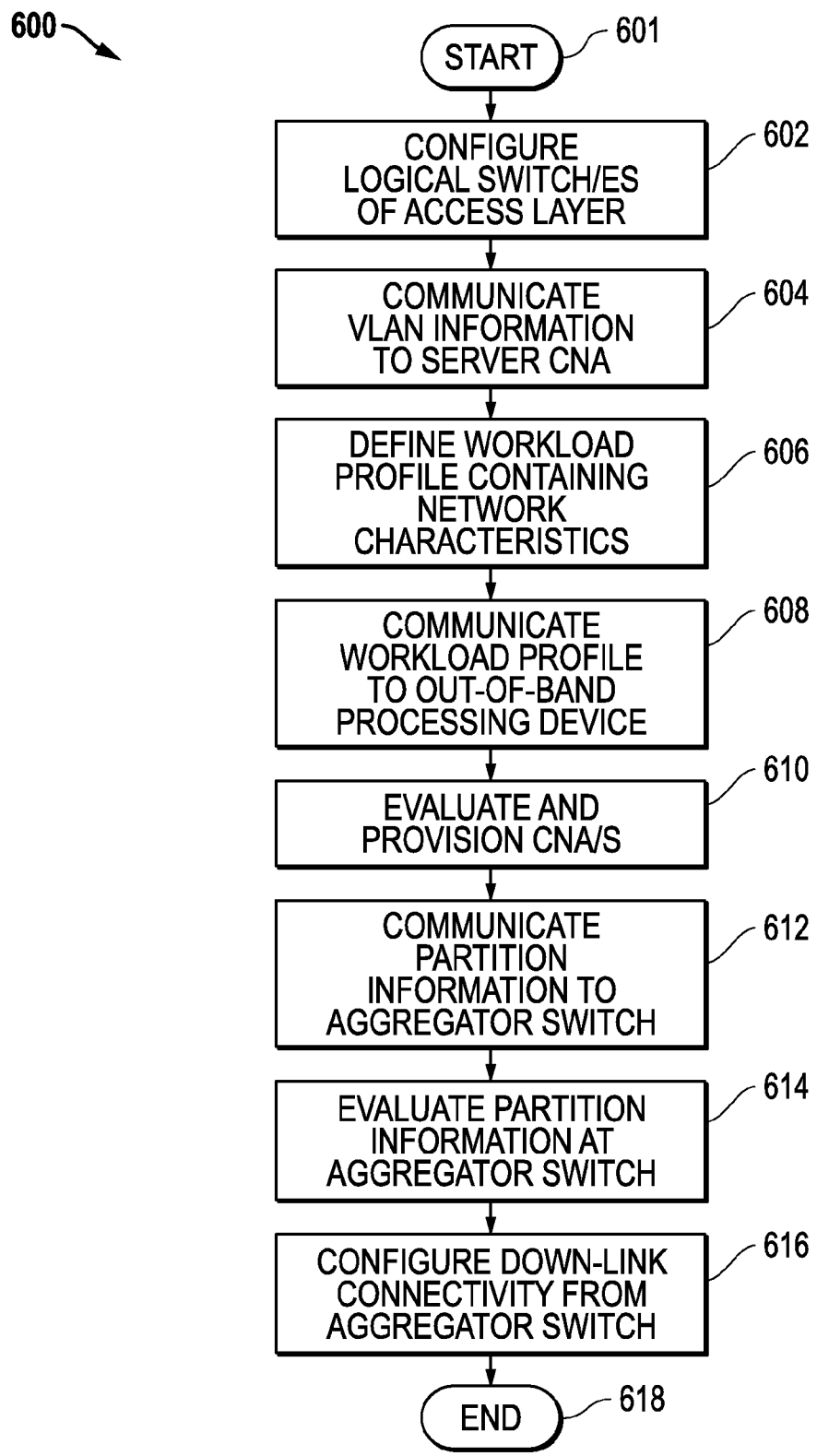
FIG. 6 illustrates methodology automatic access layer configuration methodology according to one exemplary embodiment of the disclosed systems and methods.

FIG. 6 illustrates one exemplary embodiment of methodology 600 that may be employed to implement automatic access layer configuration of a given aggregator switch 109 for one or more servers 180 of FIGS. 1-5. In this regard, it will be understood that the disclosed systems and methods, including methodology 600, may be implemented with a scalable information handling system having multiple modular servers (e.g., such as a modular blade server chassis system 100 of FIG. 1), or may alternatively be implemented with any other server configuration, e.g., such as rack server systems, stand-alone tower server systems, etc. Moreover, methodology 600 may be implemented to automatically configure an access layer 111 that includes a single aggregator switch 109 or that includes multiple aggregator switches $109_1$-$109_N$.

As shown in FIG. 6, methodology 600 begins in step 601, e.g., with logical switch modules 190 of the access layer having no LAG configuration although it is also possible that a previous LAG configuration for switch modules 190 may exist but need to be reconfigured. Next, in step 602 logical switch modules 190 are each configured with the identity of the particular upstream LAGs 195 that will provide the uplink connectivity between the logical switches 190 and the distribution layer switch 172. In this regard, aggregator switch 109 may be provided with a controller 131 or other suitable processing device that is configured to automatically detect the identity of particular LAG/s coupled to uplink switches ports 202, e.g., using link aggregation configuration protocol (LACP) communications received from one or more distribution layer switches 172).

Aggregator switch 109 may be further configured to discover the identity of the correct set of upstream VLANs 302 currently associated with each identified LAG 195, e.g., using Generic Attribute VLAN Registration Protocol (GVRP) or Multiple VLAN Registration Protocol (MVRP) communications across distribution layer switches 172. For example, in the exemplary embodiment of FIG. 3, the set of VLAN 10 and VLAN 11 are discovered associated with LAG $195_1$ and VLAN 50 and VLAN 51 are discovered associated with LAG $195_N$. Each of the separate VLANs may represent, for example, different types of data traffic flowing to user networks through corresponding LAGs 195. It is also possible that when two upstream LAGs $195_1$ and $195_N$ are connected to different distribution layer switches 172 that they may discover the same or overlapping set of VLANs, and operate without any conflict as they connect to different logical switches 190. Additionally, in one exemplary embodiment particular data traffic type may be defined (e.g., by a user such as an administrator) in step 602 to correspond to one or more VLANs, e.g., "Storage Network" may be predefined to correspond to "VLAN 10".

Figure 3:
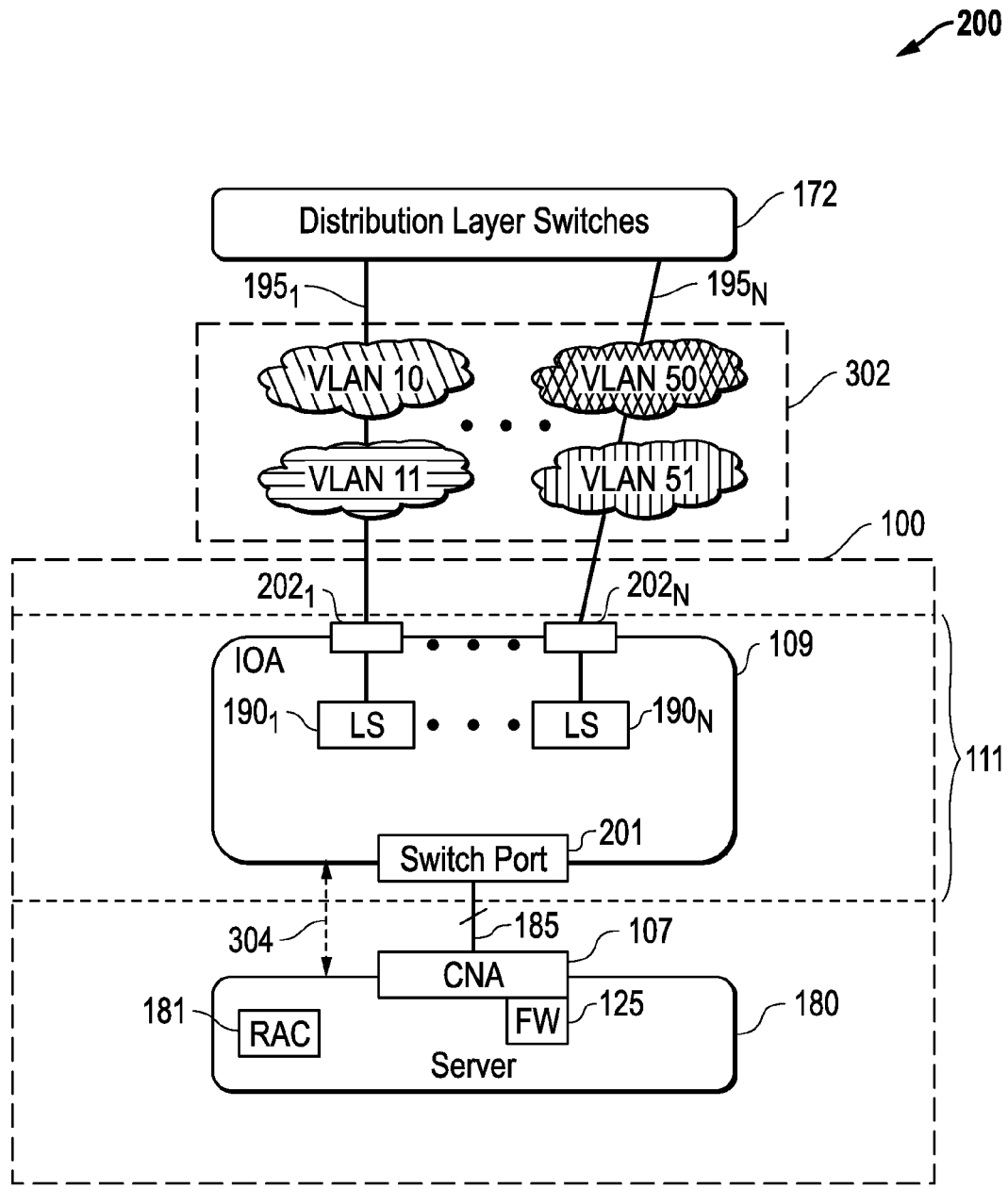
FIG. 3 illustrates a simplified block diagram of a network architecture according to one exemplary embodiment of the disclosed systems and methods.

Next, in step 604, aggregator switch 109 and a server/s 180 may exchange information 304 that includes the discovered upstream VLAN set information, which is communicated from aggregator switch 109 to CNA 107 via switch port 201 (e.g., using Link Layer Discovery Protocol (LLDP) communication or other suitable communication protocol) to make a processing device (e.g., controller) of CNA 107 of each server 180 aware of the VLANs that are accessible via switch port 201 as shown in FIG. 3. In the illustrated embodiment of FIG. 3, the exchanged VLAN set information 304 includes the identity of VLAN 10 and VLAN 11 set associated with LAG $195_1$, and the identity of VLAN 50 and VLAN 51 set associated with LAG $195_N$, it being understood that a VLAN set associated with any given LAG may include more than two VLANs or may be limited to a single VLAN. After being received by CNA 107, the discovered upstream VLAN set information may be communicated from CNA 107 to remote access controller 181 or server 180, e.g., by storing the information on firmware 125 of CNA 107 and then making the stored information on firmware 125 available to remote access controller 181 via internal communication path/s (see FIG. 4).

In step 606, a user (e.g., such as an administrator) may define a workload profile template 402 (see FIG. 4) that contains network characteristics including networking requirements of the workload for server 180, e.g., including specified VLAN personalities, types of connections, connection bandwidth, etc. In this regard, a workload profile 402 may define requirements for one or more desired network connections by specifying network characteristics for each given network connection, such as a) identity of VLANs associated with each network connection; b) type of connection (e.g. iSCSI, Ethernet, FCoE); c) Native VLAN; d) Desired Bandwidth, etc. An example combination of user-defined information within workload template 402 might be to specify that a VMware ESXi hypervisor (alternatively a Microsoft Exchange server, a Linux server, etc.) needs four network interface controllers (NICs 1 through 4) with NIC 1 connected to VLAN 10, NIC 2 connected to VLAN 11, NIC 3 connected to VLAN 50 and NIC 4 connected to VLAN 51. In an alternative embodiment, a user need only enter identity of a predefined data traffic type in step 606 (e.g., such as by entering the name "Storage Network" defined in step 602) without specifying particular VLAN identity (e.g., without specifying VLAN 10 for the Storage Network), thus providing a more user-friendly interface environment. In any case, the user may define the workload template profile 402, for example, by entering configuration data using a graphical user interface (GUI) and/or other suitable type of I/O interface through an external console such as local control panel/display 133 or via remote administrative interface 128.

In step 608, the entered desired user-defined workload profile information 402 of step 606 may be transmitted for server provisioning via an out-of-band data path 410 to an out-of-band processing device of information handling system 100. For example, workload profile information 402 may be transmitted to remote access controller 181 of each implicated server 180 as shown in FIG. 4, e.g., through CMC 132. In an alternative embodiment where service processor 110 is configured to handle access layer information, the user-defined workload profile information 402 may be transmitted only to CMC 132, and CMC 132 may be configured to perform automatic access layer configuration tasks rather than remote access controller 181.

Next, in step 610, an out-of-band processor (e.g., remote access controller 181) of a respective given server 180 may be configured to evaluate the received desired workload profile 402 for that given server 180 and perform one or more provisioning tasks to provision the corresponding server CNA 107 accordingly, e.g., with the appropriate network partitions 460 and/or desired bandwidth for the server workload as specified by profile 402. In this regard, remote access controller 181 may leverage the discovered VLAN set information (e.g., accessible VLANs) received in step 604 from aggregator switch 109 by evaluating VLAN availability and creating one or more network partitions 460 configured for connectivity to the particular VLANs associated with the specified server workload.

As an example, if logical switch $190_1$ is connected to VLAN 10 and VLAN 11, and logical switch $190_N$ is connected to VLAN 50 and VLAN 51, then remote access controller 181 may in one exemplary embodiment attempt to provision a workload which requires connectivity to VLAN 50, by carving out a partition 460 on the physical server port of CNA 107 that has connectivity to switch $190_N$. It will be understood that in one embodiment, different aggregator switches (IOAs) 109 may have access to different VLANs, so that a server 180 may have multiple CNA ports 201, each of which is physically wired to a different aggregator switch 109. Other CNA provisioning tasks that may be accomplished by remote access controller 181 include, but are not limited to, bandwidth partitioning. For example, remote access controller 181 may partition a total bandwidth of 10 gigabits between CNA 107 and aggregator switch port 201 into four separate fabric links 185 with corresponding bandwidths of 2 gigabit, 2 gigabit, 4 gigabit and 2 gigabit that corresponding to separate bandwidth requirements for each of VLAN 10, VLAN 11, VLAN 50 and VLAN 51 as specified in workload profile 402. Each of these network partitions $460_1$, $460_2$, $460_3$ and $460_4$ will be recognized as separate virtual NICs by the corresponding OS executing on in-band processing devices 120/122 of the given modular server 180, and are denoted in FIG. 4 with separate cross-hatching that matches a corresponding VLAN 302.

Remote access controller 181 may communicate provisioning instructions to CNA 107 via real-time hardware path/s 420 or in any other suitable manner, e.g., by staging a corresponding CNA provisioning request and having a host processing device 120/122 boot and configure the CNA 107 through a UEFI environment. In this regard, further information on implementation of a UEFI environment may be found, for example, in U.S. Pat. No. 8,510,422 issued Aug. 13, 2013; U.S. patent application Ser. No. 12/925,673 filed Oct. 27, 2010; U.S. patent application Ser. No. 13/365,901 filed Feb. 3, 2012; and U.S. patent application Ser. No. 13/618,666 filed Sep. 14, 2012, with each of the foregoing being incorporated herein by reference in its entirety for all purposes.

In step 612, CNA 107 communicates information 480 (e.g., using LLDP), including the set of network partitions 460 that are associated with it, upstream to aggregator switch 109, including the network connectivity requirements and identity of required VLAN connections for each network partition 460. In one embodiment, this information 480 may be communicated as a single data message that includes information about all network partitions 460 defined by remote access controller 181 in step 610 and each partition 460 may have information on the VLANs that are associated with it. However, any other suitable number of data messages and/or type of data messaging format may alternatively employed in step 612. For example, in one embodiment, CAN 107 may only communicate identity of a predefined data traffic type in step 612 (e.g., such as by communicating the identifier name "Storage Network" defined in step 602) without specifying particular VLAN identity (e.g., without specifying VLAN 10 for the Storage Network).

In step 614, a controller or other processing device 131 of aggregator switch 109 may evaluate the received set of partitions (or virtual ports) 460 that are associated with the connected CNA server port 107. Then in step 616, a processing device of aggregator switch 109 (e.g., executing suitable firmware) may configure the appropriate down-link connectivity through network interface paths 517 extending between each appropriate logical switch 190 and the corresponding partition/s (virtual NICs or port/s) 460 before methodology 600 ends in step 618. In this regard, FIG. 5 shows aggregator switch port 201 configured by a processing device of aggregator switch 109 to have virtual port partitions $560_1$, $560_2$, $560_3$ and $560_4$ that correspond to respective virtual NICs $460_1$, $460_2$, $460_3$ and $460_4$. Then based on the identity of required VLAN connections for each of identified network partitions 460 previously communicated from CNA 107 in information 480, processing device of aggregator switch 109 may configure network interface connection paths 517 within switch 109 such that virtual NICs $460_1$ and $460_2$ are configured with a connection to logical switch $190_1$, and such that virtual NICs $460_3$ and $460_4$ configured with a connection to logical switch $190_N$. As shown in FIG. 5, virtual NICs $460_1$ and $460_2$ have been automatically configured at this point with connectivity through logical switch $190_1$ and uplink port $202_1$ to support VLAN 10 and VLAN 11 on LAG $195_1$, and virtual NICs $460_3$ and $460_4$ have been automatically configured with connectivity through logical switch $190_N$ and uplink port $202_N$ to support VLAN 50 and VLAN 51 on LAG $195_N$.

It will be understood that the particular type/s and number of automatically executed access layer configuration tasks (e.g., executed by one or more processing devices of server chassis system 100) may differ depending on the particular chassis configuration, e.g., modular versus singular server, etc. Moreover, it will also be understood that the illustrated steps and order of steps shown in FIG. 6 are exemplary only, and that any other combination of additional, fewer or alternative steps may be employed that is suitable for accomplishing access layer configuration.

It will be understood that one or more of the tasks, functions, or methodologies described herein (e.g., including those performed by management subsystem 132, remote access controller 181, remote access controller 181, and/or processing devices associated with aggregator switch 109) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system configured for coupling to an external network, comprising:
    an access layer comprising at least one aggregator switch including an aggregator switch processing device and multiple logical switches controlled by the processing device, the aggregator processing device being configured to control the multiple logical switches to selectably route network communications between the information handling system and the external network across one or more corresponding selected separate external network communication streams;
    at least one in-band processing device;
    at least one converged network adapter (CNA) coupled between the in-band processing device and the logical switches of the aggregator switch; and
    at least one out-of-band processing device coupled to control the CNA, the out-of-band processing device being separate from the in-band processing device;
    where the aggregator switch processing device is configured to automatically:
        discover an identity of the selected external network communication streams corresponding to the network communications; and
        communicate the discovered identity of the selected network communication streams from the aggregator switch to the out-of band processing device through the CNA.

2. The information handling system of claim 1, where each of the selected separate external network communication streams is a link aggregation group (LAG); where the aggregator switch processing device is configured to automatically control the logical switches to selectably route network communications between the CNA and the external network across one or more corresponding selected separate LAGs.

3. The information handling system of claim 2, where the aggregator switch comprises at least one downstream aggregator switch port coupled between an upstream port of the CNA and the logical switches, and a separate and different uplink aggregator switch port coupled between the logical switches and each of the separate LAGs; where the logical switches comprise multiple logical switch modules that provide communication between the downstream aggregator switch port and each of the separate LAGs through the multiple uplink aggregator switch ports of the aggregator switch; where each of the selected separate LAGs is designated to transfer data traffic associated with one or more different virtual local area network (VLANs) between an uplink aggregator switch port and the external network; where the aggregator switch processing device is configured to discover the identity of the one or more VLANs associated with each of the separate LAGs; and where the out-of band processing device is configured to provision a workload of the server by partitioning the upstream port of the CNA based at least in part on the discovered identity of the VLANs associated with each of the separate LAGs in order to provide connectivity between a given partition on the upstream port of the CNA with a given LAG through the corresponding logical switch module and uplink aggregator switch port that is coupled to the given LAG.

4. The information handling system of claim 2, where the out-of-band processing device is configured to automatically control the CNA to partition an upstream port of the CNA into multiple upstream partitions to meet network characteristics required for implementing a defined server workload based at least in part on the discovered identity of the selected external network communication streams.

5. The information handling system of claim 4, where each of the selected separate LAGs is designated to transfer data traffic associated with one or more different virtual local area network (VLANs) between an uplink aggregator switch port of the aggregator switch and the external network; where the network characteristics required for implementing the defined server workload comprise at least one of an identity of one or more required virtual local area networks (VLANs) required for implementing the defined server workload, a type of network connection for implementing the server workload, a required network connection bandwidth, or a combination thereof.

6. The information handling system of claim 5, where the CNA is configured to automatically communicate an identity of the set of multiple upstream CNA partitions together with the network characteristics required for implementing the defined server workload to the aggregator switch processing device; and where the aggregator switch processing device is configured to configure the appropriate down-link connectivity through the logical switches of the aggregator switch based on the received identity of the set of multiple upstream partitions of the CNA and the received network characteristics required for implementing the defined server workload such that each of the multiple upstream partitions of the CNA is automatically connected through the aggregator switch to the one or more VLANs with a connection that satisfies the received network characteristics required for implementing the defined server workload.

7. The information handling system of claim 4, where the aggregator switch processing device and the out-of-band processing device are configured to cooperate to automatically configure an appropriate down-link connectivity through the logical switches of the aggregator switch that satisfies the received network characteristics required for implementing the defined server workload without external control of either the aggregator switch processing device or the out-of-band processing device.

8. The information handling system of claim 4, where each of the selected separate LAGs is designated to transfer data traffic associated with one or more different virtual local area network (VLANs) between an uplink aggregator switch port of the aggregator switch and the external network; where the network characteristics required for implementing the defined server workload comprise an identity of one or more required virtual local area networks (VLANs) required for implementing the defined server workload; and where the out-of band processing device is configured to automatically provision the defined server workload by partitioning the upstream port of the CNA based at least in part on the discovered identity of the VLANs associated with each of the separate LAGs in order to enable connectivity between a given partition on the upstream port of the CNA with the one or more VLANs required for implementing the defined server workload through the aggregator switch.

9. The information handling system of claim 4, where the out-of-band processing device is configured to receive the defined server workload from a user.

10. The information handling system of claim 1, where the information handling system is a scalable information handling chassis system comprising multiple modular server units, each given one of the modular server units including at least one of the in-band processing devices and at least one of the CNAs coupled between the in-band processing processing device of the given modular server unit and the aggregator switch.

11. The information handling system of claim 10, where the scalable information handling chassis system comprises a modular blade server chassis system; and where each of the modular server units comprises a blade server.

12. A method for automatically configuring an access layer of an information handling system having an in-band processing device that is coupled to an external network through at least one converged network adapter (CNA) and an aggregator switch of the access layer, the method comprising:
controlling multiple logical switches of the aggregator switch with an aggregator switch processing device to selectably route in-band processing device communications between the CNA of the information handling system and the external network across one or more corresponding selected separate external network communication streams that extend between the aggregator switch and the external network;
using at least one out-of-band processing device of the information handling system that is separate from the in-band processing device to control the CNA; and
using the aggregator switch processing device to automatically:
discover an identity of the selected external network communication streams corresponding to the network communications; and
communicate the discovered identity of the selected network communication streams to the out-of band processing device from the aggregator switch through the CNA.

13. The method of claim 12, where each of the selected separate external network communication streams is a link aggregation group (LAG); and where the method further comprises using the aggregator switch processing device to automatically control the logical switches to selectably route network communications between the CNA and the external network across one or more corresponding selected separate LAGs.

14. The method of claim 13, where the aggregator switch comprises at least one downstream aggregator switch port coupled between an upstream port of the CNA and the logical switches, and a separate and different uplink aggregator switch port coupled between the logical switches and each of the separate LAGs; where the logical switches comprise multiple logical switch modules that provide communication between the downstream aggregator switch port and each of the separate LAGs through the multiple uplink aggregator switch ports; where each of the selected separate LAGs is designated to transfer data traffic associated with one or more different virtual local area network (VLANs) between an uplink aggregator switch port and the external network; and where the method further comprises:
using the aggregator switch processing device to discover the identity of the one or more VLANs associated with each of the separate LAGs; and
using the out-of band processing device to provision a workload of the server by partitioning the upstream port of the CNA based at least in part on the discovered identity of the VLANs associated with each of the separate LAGs in order to provide connectivity between a given partition on the upstream port of the CNA with a given LAG through the corresponding logical switch module and uplink aggregator switch port that is coupled to the given LAG.

15. The method of claim 13, further comprising using the out-of-band processing device to automatically control the CNA to partition an upstream port of the CNA into multiple upstream partitions to meet network characteristics required for implementing a defined server workload based at least in part on the discovered identity of the selected external network communication streams.

16. The method of claim 15, where each of the selected separate LAGs is designated to transfer data traffic associated with one or more different virtual local area network (VLANs) between an uplink aggregator switch port of the aggregator switch and the external network; where the network characteristics required for implementing the defined server workload comprise at least one of an identity of one or more required virtual local area networks (VLANs) required for implementing the defined server workload, a type of network connection for implementing the server workload, a required network connection bandwidth, or a combination thereof; and where the method further comprises:

using the CAN to automatically communicate an identity of the set of multiple upstream CNA partitions together with the network characteristics required for implementing the defined server workload to the aggregator switch processing device; and using the aggregator switch processing device to configure the appropriate down-link connectivity through the logical switches of the aggregator switch based on the received identity of the set of multiple upstream partitions of the CNA and the received network characteristics required for implementing the defined server workload such that each of the multiple upstream partitions of the CNA is automatically connected through the aggregator switch to the one or more VLANs with a connection that satisfies the received network characteristics required for implementing the defined server workload.

17. The method of claim 15, further comprising using the aggregator switch processing device and the out-of-band processing device together to automatically configure an appropriate down-link connectivity through the logical switches of the aggregator switch that satisfies the received network characteristics required for implementing the defined server workload without external control of either the aggregator switch processing device or the out-of-band processing device.

18. The method of claim 15, where each of the selected separate LAGs is designated to transfer data traffic associated with one or more different virtual local area network (VLANs) between an uplink aggregator switch port of the aggregator switch and the external network; where the network characteristics required for implementing the defined server workload comprise an identity of one or more required virtual local area networks (VLANs) required for implementing the defined server workload; and where the method further comprises using the out-of band processing device to automatically provision the defined server workload by partitioning the upstream port of the CNA based at least in part on the discovered identity of the VLANs associated with each of the separate LAGs in order to enable connectivity between a given partition on the upstream port of the CNA with the one or more VLANs required for implementing the defined server workload through the aggregator switch.

19. The method of claim 15, further comprising using the out-of-band processing device to receive the defined server workload from a user.

20. The method of claim 12, where the information handling system is a scalable information handling chassis system comprising multiple modular server units, each given one of the modular server units including at least one of the in-band processing devices and at least one of the CNAs coupled between the in-band processing processing device of the given modular server unit and the aggregator switch.

* * * * *